(12) United States Patent
Fan

(10) Patent No.: US 6,314,825 B1
(45) Date of Patent: Nov. 13, 2001

(54) KEYBOARD TESTING APPARATUS

(75) Inventor: Jackley Fan, Chung-Li (TW)

(73) Assignee: Behavior Tech Computer Corp., Taipei (TW)

( * ) Notice: Subject to any disclaimer, the term of this patent is extended or adjusted under 35 U.S.C. 154(b) by 0 days.

(21) Appl. No.: 09/252,095

(22) Filed: Feb. 18, 1999

(51) Int. Cl.$^7$ .................................................. G01M 19/00
(52) U.S. Cl. ............................................................ 73/865.3
(58) Field of Search ........................... 73/865.3, 865.9, 73/12.01, 12.09; 400/180, 473

(56) References Cited

U.S. PATENT DOCUMENTS

| | | | |
|---|---|---|---|
| 4,441,833 | * | 4/1984 | Hasenbalg . |
| 5,192,152 | * | 3/1993 | Silvestri et al. . |
| 5,827,983 | * | 10/1998 | Ortoli .................................. 73/865.3 |

* cited by examiner

Primary Examiner—Robert Raevis
(74) Attorney, Agent, or Firm—Rosenberg, Klein & Lee

(57) ABSTRACT

A keyboard testing apparatus includes a housing inside which two clamping members spaced from each other at an adjustable distance for receiving a keyboard to be tested therebetween. A retaining device includes a pneumatic cylinder for applying force to the keyboard for firmly retaining the keyboard in position. An indicator testing device includes several optic sensors for detecting light emitted from indicators of the keyboard. A key testing device includes several key actuators capable to sequentially actuate/de-actuate the keys of the keyboard. A conveying device drives the key actuators relative to the keyboard in order to position the key actuators with respect to each key of the keyboard. A control unit, preferably a processor-based device, controls the operation of the key testing apparatus and receives test signals from the keyboard and the optic sensors to determine if the keyboard function normally. The control unit generates a warning signal via a warning device when the keyboard is abnormal. The control unit also stores information of the test result for further processing.

24 Claims, 7 Drawing Sheets

KEYBOARD TESTING APPARATUS

FIELD OF THE INVENTION

The present invention generally relates to a keyboard testing apparatus, and in particular to an apparatus for automatically testing indicators and keys of a keyboard.

BACKGROUND OF THE INVENTION

Keyboards have been widely used to serve as a man-machine interface between a user and an electronic apparatus, such as personal computer, industrial controller, and cash registers. An incorrectly-operating keyboard may lead to incorrect data input and thus cause serious damage to the electronic apparatus.

Conventionally, a keyboard is tested manually by sequentially depressing the keys thereof by an operator. This is very inefficient. Furthermore, since the keys are manually depressed for test, the force that the operator applies to different keys may be different which may result in incorrect test result.

It is thus desirable to have a keyboard testing apparatus that efficiently and effectively tests a keyboard in order to overcome the above problems.

SUMMARY OF THE INVENTION

Accordingly, an object of the present invention is to provide a keyboard testing apparatus, which automatically and sequentially test keys and indicators a keyboard whereby the keyboard is efficiently and effectively tested.

Another object of the present invention is to provide a keyboard testing apparatus, which applies substantially the same force to all the keys of the keyboard for testing the keys thereby reducing the likelihood of incorrect test result.

A further object of the present invention is to provide a keyboard testing apparatus wherein the force applied to keys of a keyboard for test can be precisely controlled.

To achieve the above objects, in accordance with the present invention, there is provided a keyboard testing apparatus comprising a housing inside which two clamping members spaced from each other at an adjustable distance for receiving a keyboard to be tested therebetween. A retaining device includes a pneumatic cylinder for applying force to the keyboard to firmly retain the keyboard in position. An indicator testing device includes several optic sensors for detecting light emitted from indicators of the keyboard. A key testing device includes several key actuators capable to sequentially actuate/de-actuate the keys of the keyboard. A conveying device moves the key actuators relative to the keyboard in order to position the key actuators with respect to each key of the keyboard. A control unit, preferably a processor-based device, controls the operation of the key testing apparatus and receives test signals from the keyboard and the optic sensors to determine if the keyboard function normally. The control unit generates a warning signal via a warning device when the keyboard is abnormal. The control unit also stores information of the test result for further processing.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENTS

Figure 1:
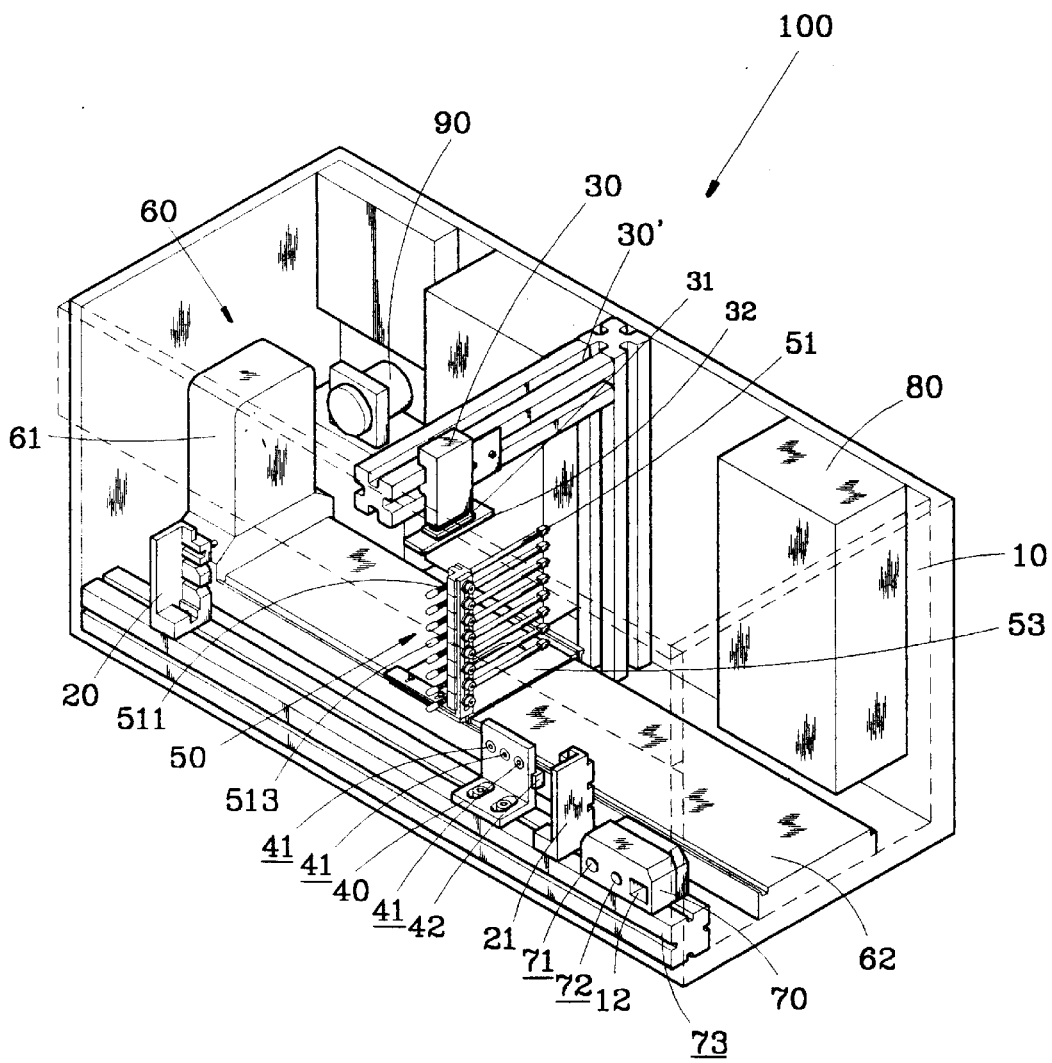
FIG. 1 is a perspective view of a keyboard testing apparatus constructed in accordance with the present invention.
Figure 2:
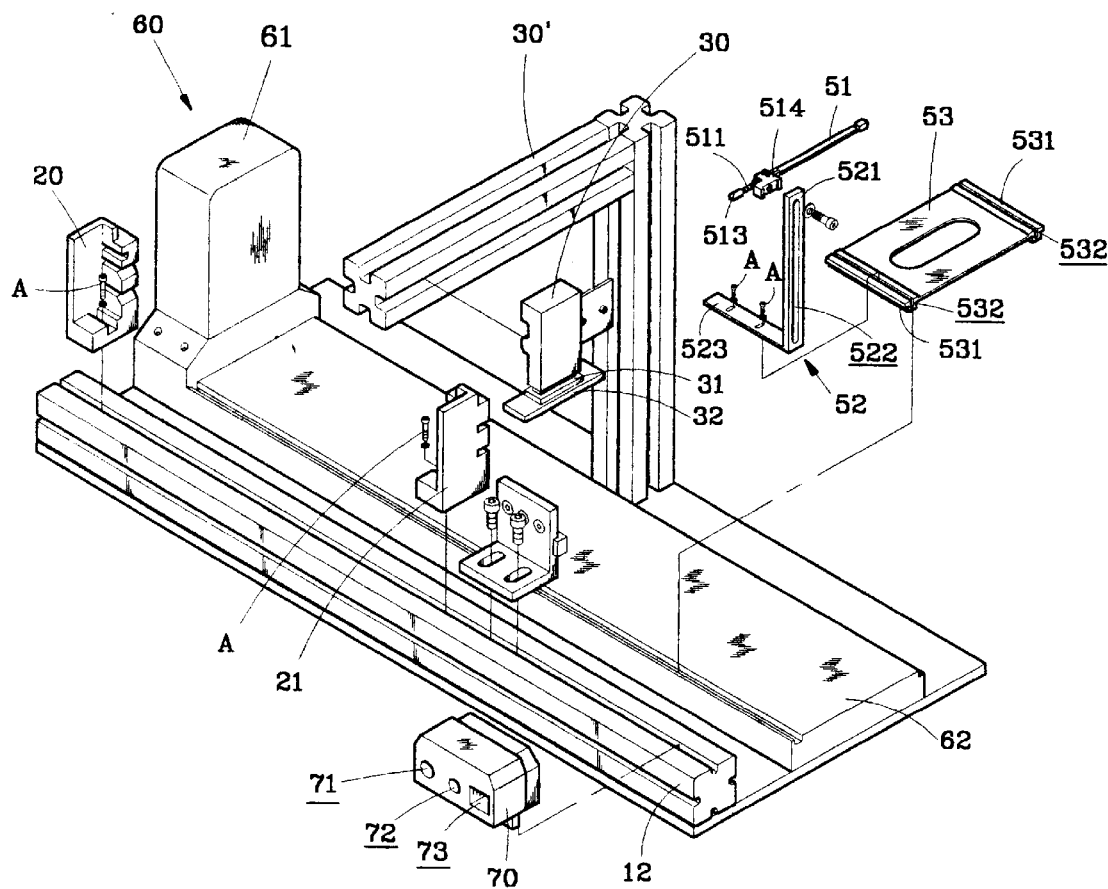
FIG. 2 is an exploded view of the keyboard testing apparatus of the present invention.
Figure 3:
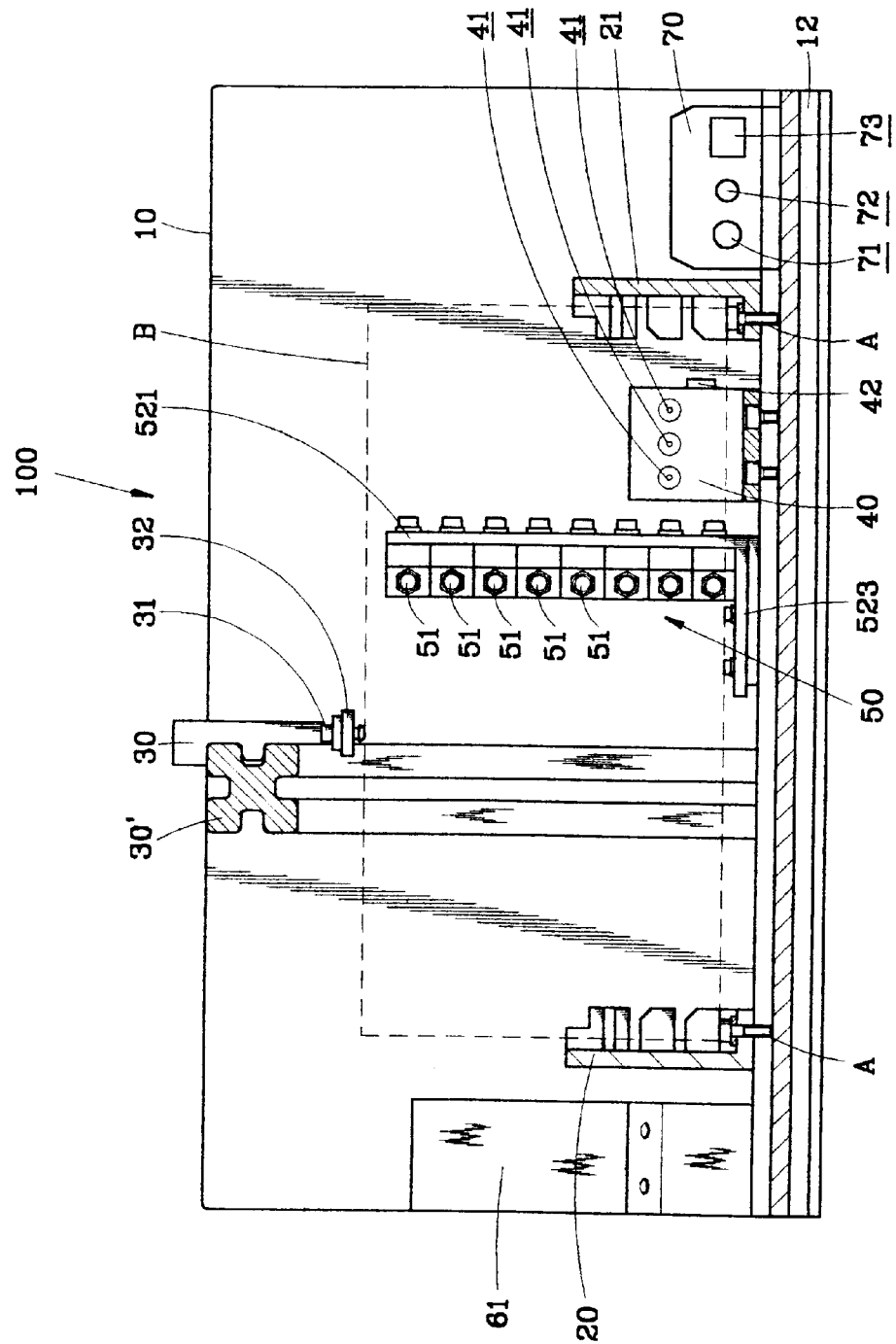
FIG. 3 is a front view of the keyboard testing apparatus of the present invention.

With reference to the drawings and in particular to FIGS. 1–3, wherein a keyboard testing apparatus constructed in accordance with the present invention, generally designated by reference numeral 100, is shown, the keyboard testing apparatus 100 comprises a housing 10 substantially enclosing the apparatus 100. The housing 10 defines an interior space therein surrounded by walls thereof At least an opening is defined in at least one wall for accessing the interior space. A rail 12 is disposed in the interior space and fixed on a bottom wall of the housing 10. Two clamping members 20, 21 are releasably mounted on the rail 12 by means of bolts A. The clamping members 20, 21 are spaced from each other to accommodate a keyboard-to-be-tested B (FIG. 5) therein with the clamping members 20, 21 engaging with and thus retaining the keyboard 200 therebetween. The clamping members 20, 21 are movable along the rail 12 to adjust the space therebetween for accommodating keyboards of different sizes. Thus the keyboard testing apparatus 100 of the present invention may be used with keyboards of different sizes and different specifications. An example of the keyboard B is shown in FIG. 6.

The keyboard testing apparatus 100 comprises at least a retaining device 30 which may be of any suitable form. In accordance with a preferred embodiment of the present invention, the retaining device 30 comprises a pneumatic actuation system, such as a pneumatic cylinder, mounted on a guide rail 30' fixed to the housing 10. In the embodiment illustrated, the guide rail 12 is L-shaped having a vertical section and a horizontal section with the pneumatic cylinder movable along the horizontal section for accommodating keyboards B of different sizes. The retaining device 30 comprises a movable shaft 31 to which a retaining member 32 is fixed. The movable shaft 31 is moved by the retaining device 30 to bring the retaining member 32 toward and into contact with the keyboard B retained between the clamping members 20, 21 thereby firmly securing the keyboard B in position.

Also referring to FIG. 3, the keyboard testing apparatus 100 comprises an indicator testing device 40 which is arranged at a suitable position between the clamping members 20, 21. The indicator testing device 40 comprises at least one optic sensor 41 for detecting light emitted from at least one indicator B1 of the keyboard B and generates an indicator test signal. Preferably, the indicator testing device 40 comprises a plurality of optic sensors 41 respectively corresponding to a number of indicators B1 of the keyboard B. In the embodiment illustrated, the indicator testing device 40 comprises three sensors 41 for detecting light emitted from three indicators B1 of the keyboard B. The number, position and arrangement of the optic sensors 41 may be changed in accordance with the indicators 41 of a particular keyboard to be tested.

A switch or detecting element 42, such as a photo-electrical switch, a proximity switch and a micro-switch, is positioned whereby the switch 42 is triggered when a keyboard B is positioned between the clamping members 20, 21 whereby the indicator testing device 40 is actuated by the switch 42. This effectively prevents an incorrect detection caused by environmental light. In accordance with an embodiment of the present invention, the switch 42 is also used to control the retaining device 30 whereby only when a keyboard B is positioned between the clamping members 20, 21 which triggers the switch 42, is the retaining device 30 actuated.

Figure 4:
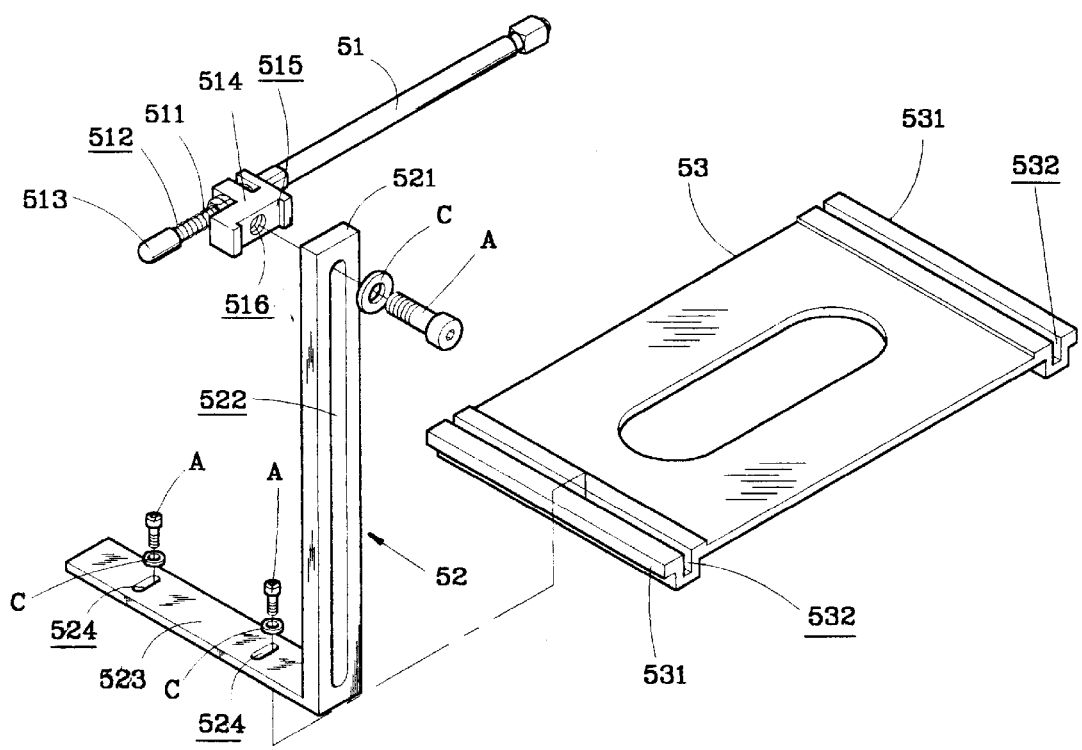
FIG. 4 is an exploded view of a key testing device of the keyboard testing apparatus of the present invention.

Referring to FIG. 4, a key testing device 50 comprises a number of key actuators 51 which may be of any suitable form. In the preferred embodiment illustrated, the key actuators 51 comprise pneumatic cylinders each having a shaft 511 movable by the corresponding pneumatic cylinder to expand/withdraw. The shaft 511 has a contact element 513 mounted on a free end thereof to be moved thereby for contacting and thus actuating a key B2 of the keyboard B. The shaft 511 is pre-loaded by a spring 512 which controls the force applied to the key B2 by the key actuator 51. In the embodiment illustrated, a block 514 is releasably fixed on the shaft 511 and spaced from the contact element 513 to receive the spring 512 therebetween.

The block 514 is fixed to a support member 52. The support member 52 may be of any configuration and is L-shaped in the embodiment illustrated comprising a vertical section 521 and a horizontal section 523. The vertical section 521 defines a vertical elongate slot 522 movably receiving a bolt A and an associated washer C. The bolt A engages with an inner-threaded hole 516 defined in the block 514 thereby securing the block 514 to the support member 52. The block 514 and the key actuator 51 are thus allowed to move along the slot 522 by loosening the bolt A. The horizontal section 523 defines a plurality of elongate slots 524 therein for each receiving a bolt A with a washer C.

A slide plate 53 has a pair of connecting sections 531 respectively proximate front and rear edges thereof. Each connecting section 531 defines a groove 532. The slots 524 of the horizontal section 523 of the support member 52 are aligned with the groove 532 of the front connecting section 531 and fixed on the slide plate 53 by means of the bolts A and washers C. The slide plate 53 is movable in the housing 10 thereby properly positioning the key testing device 50 with respect to a particular keyboard B to be tested. The support member 52 is selectively mounted to the front or rear groove 532 and this changes the position of the support member 52 and the key testing device 50 with respect to the keyboard B.

A conveying device 60 comprises a rail 62 which is driven by motor 61 to reciprocally move in a direction substantially parallel to the keyboard B. The rail 62 is coupled to the connecting section 531 of the slide plate 53 for moving the slide plate 53 along the rail 62.

A signal adapter 70 is mounted on the rail 12. The adapter 70 has a number of sockets 71, 72, 73 for mating different keyboard cable end connector (not shown), such as ISA type connector or USB type connector, in order to transfer a key test signal caused by the actuation of a key B2 of the keyboard B to a control unit 80.

The control unit 80 comprises a microprocessor based device, such as a programmable logic control (PLC) or a personal computer which receives the indicator test signal from the indicator testing device 40 and the key test signal from the signal adapter 70 that is connected to the keyboard B. Based on the signals, the control unit 80 determines if the indicators B1 and the keys B2 function properly. A fault warning signal is given off via a warning device 90 by the control unit 80 if either one of the indicators B1 and the keys B2 does not function properly. The control unit 80 is electrically coupled to the key testing device 50 and the conveying device 60 for controlling the actuation of the key testing device 50 and the movement of the conveying device 60.

The warning device 90 may be of any desired form. In the embodiment illustrated, the warning device 90 comprises a buzzer that is controlled and driven by the control unit 80 to give off the fault warning signal for indicating an abnormal condition of the keyboard B that is being tested. If desired, the warning device 90 may further comprise a light source which gives off a visual warning.

Figure 5:
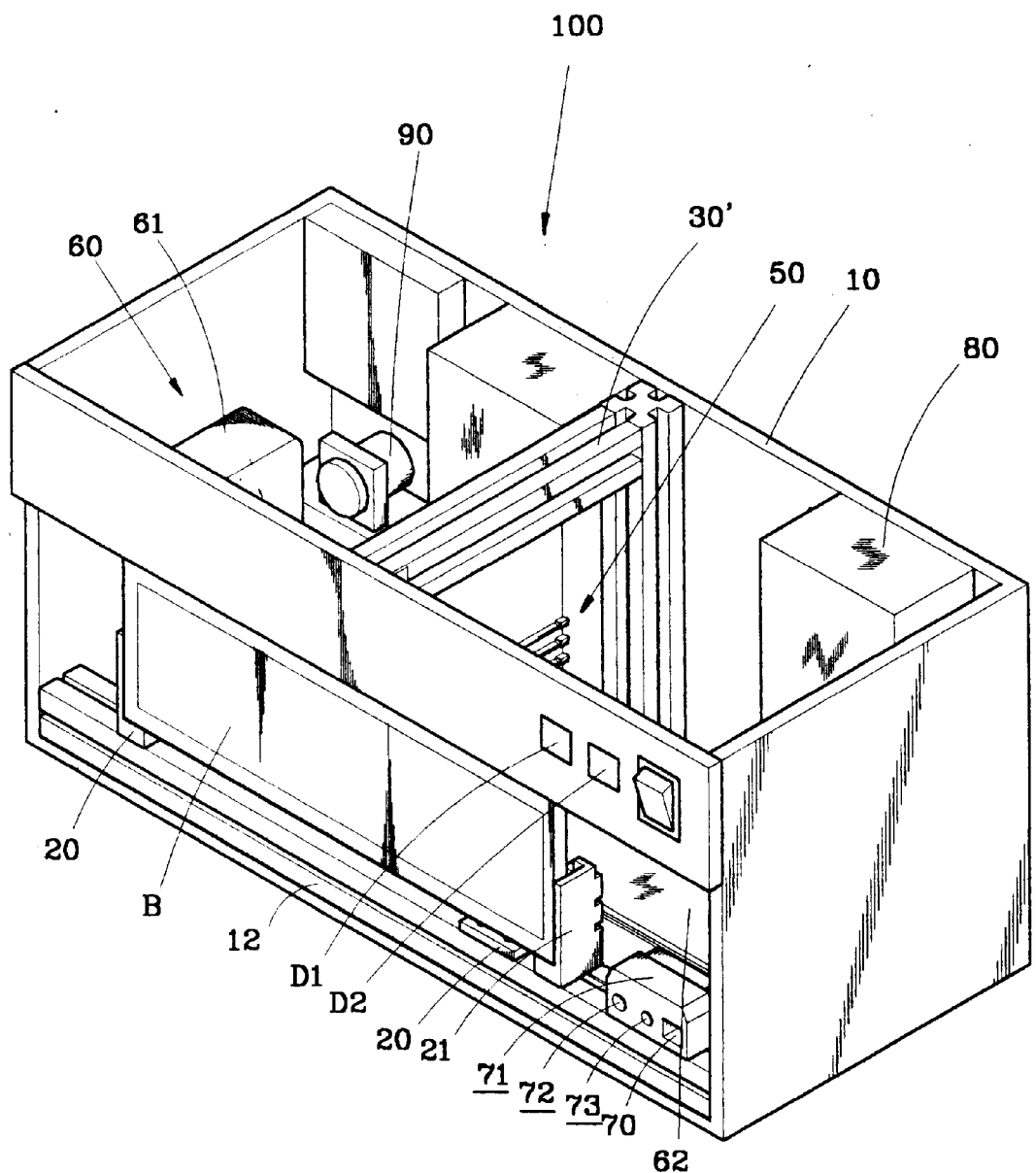
FIG. 5 shows an application of the keyboard testing apparatus of the present invention wherein a keyboard is loaded in the apparatus to be tested thereby.
Figure 6:
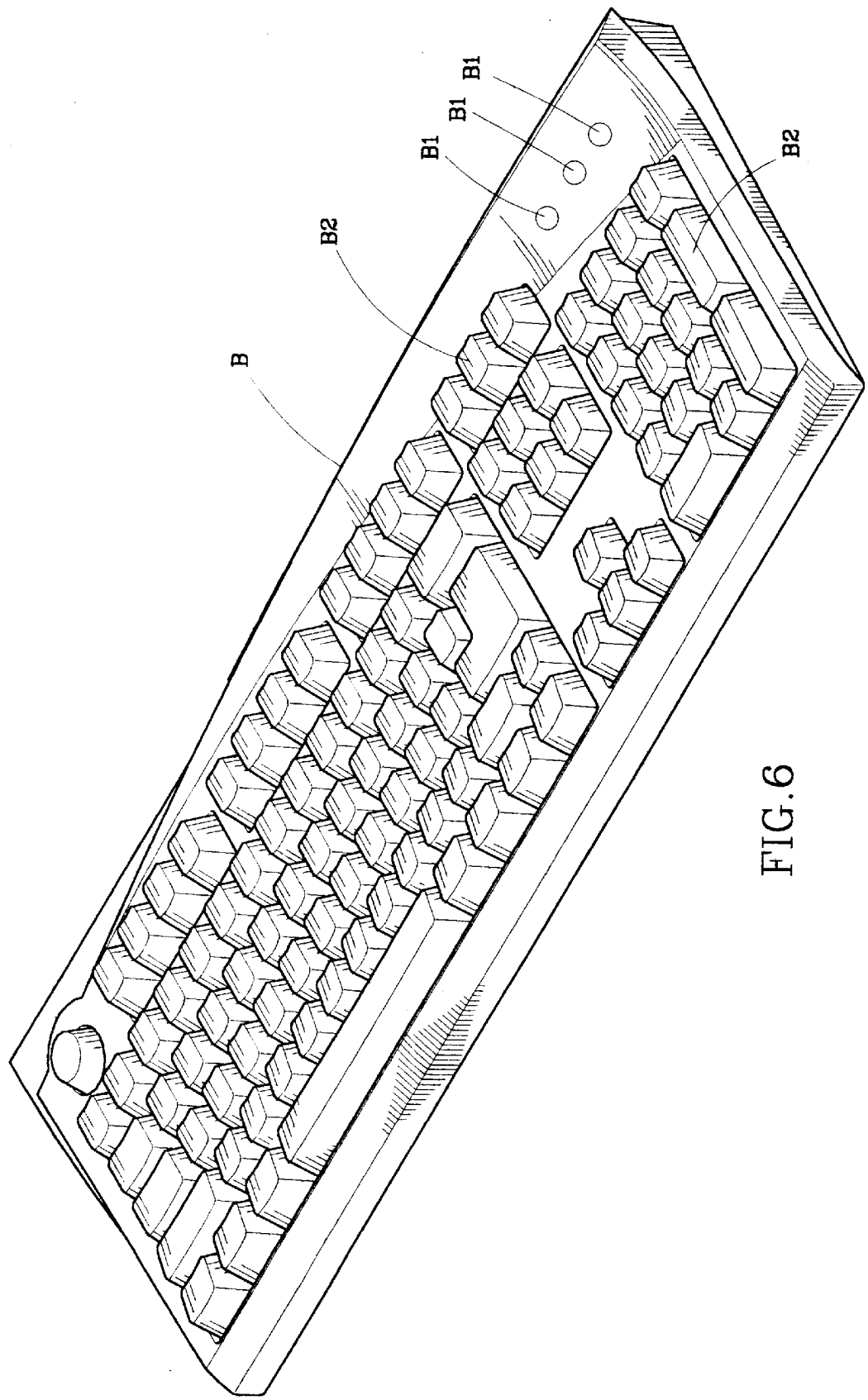
FIG. 6 is a perspective view of a keyboard to be tested by the keyboard testing apparatus of the present invention.

Referring to FIG. 5 which shows a condition when a keyboard B is tested by the keyboard testing apparatus 100 of the present invention, as noted above, the keyboard B is clamped between the clamping members 20, 21 and the switch 42 is triggered, indicating the presence of the keyboard B. The retaining device 30 is actuated by the switch 42 to firmly retain the keyboard B in position. The indicators B1 of the keyboard B are turned on and the indicator testing device 40 detects the light emitted from the indicators B1. If an abnormal condition is determined, then the test stops and the control unit 80 gives off the fault warning signal via the warning device 90.

A pair of indicators D1, D2 may be included which respectively indicate a normal condition and an abnormal condition of the keyboard B. The indicators D1, D2 are controlled by the control unit 80.

Figure 7:
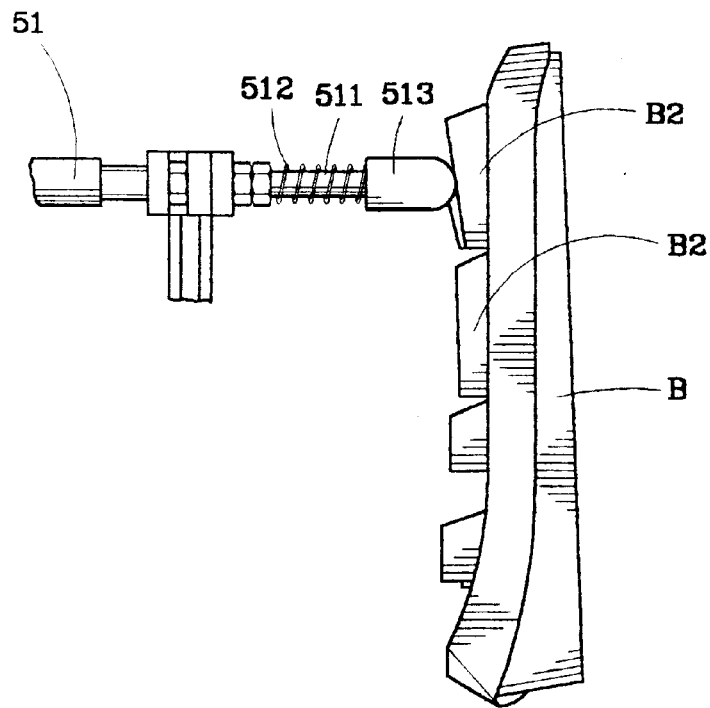
FIG. 7 is a partial side view of FIG. 5 showing a key actuator of the key testing device actuating a key of the keyboard.

After the indicator test is completed a key test is performed. FIG. 7 shows a key B2 actuated by the contact element 513 of a corresponding key actuator 51. The contact element 513 is moved by the conveying device 60 to sequentially actuate the keys B2 of the keyboard for testing the keys B2 and a key test signal for each key B2 is generated and applied to the control unit 80. If an abnormal condition is determined by the control unit 80 during testing the keys B2, a fault warning signal is generated by means of the warning device 90 and the test stops. The abnormal key is recorded in the control unit 80 for further use in detailed inspection and repairing of the key.

Figure 8:
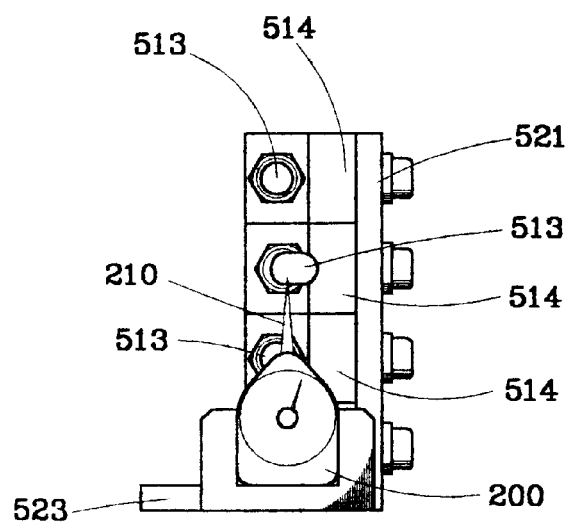
FIG. 8 is a front view showing the key actuators of the key testing device is calibrated by a pressure gauge.

FIG. 8 shows a calibration process for the key actuators 51 of the key testing device 50. A contact pressure gauge 200 has a probe 210 which is sequentially and individually engaged by the contact element 513 of each key actuator 51 to obtain the contact force reading thereof The reading provides a reference for adjusting the pre-loaded spring 512 of each key actuator 51 to obtain a uniform pre-load on all key actuators 51.

The pre-load of the key actuator 51 may be changed in accordance with the types of the keyboard to be tested in order to provide a more precise test result.

The keyboard testing apparatus 100 provides a measure for automatically testing keyboards whereby testing keyboard may be performed efficiently and effectively to obtain accurate test result.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A keyboard testing apparatus for testing a keyboard having at least one indicator and a plurality of keys, comprising:

a pair of clamping members spaced from each other by a distance sufficient to accommodate the keyboard;

a retaining device for firmly retaining the keyboard in position between the clamping members;

an indicator test device comprising an optic sensor corresponding to the indicator of the keyboard for detecting light emitted from the indicator which generates an indicator test signal;

a key testing device comprising a plurality of key actuators each having a movable shaft having an end movable relative to the keys for selectively actuating and deactuating at least one of the keys, the actuation of the key generating a key test signal;

a conveying device comprising a rail reciprocally movable in a direction parallel to the keyboard, the rail being coupled to the key testing device for moving the key testing device relative to the keyboard;

a signal adapter adapted to releasably mate with an output connector of the keyboard;

a control unit electrically connected to the signal adapter and the indicator test device for receiving the key test signal and the indicator test signal therefrom whereby the control unit determines if the keys and the indicator are normal; and, a warning device which is controlled by the control unit to generate a warning signal when the control unit determines that any key or any indicator does not function normally.

2. The keyboard testing apparatus as claimed in claim 1, wherein the clamping members, the retaining device, the indicator testing device, the key testing device, the conveying device, the signal adapter, the control unit and the warning device are enclosed in a housing.

3. The keyboard testing apparatus as claimed in claim 2, wherein the housing defines an opening in a wall thereof.

4. The keyboard testing apparatus as claimed in claim 2, wherein a rail is fixed on a bottom of the housing.

5. The keyboard testing apparatus as claimed in claim 4, wherein the clamping members and the indicator testing device are releasably mounted on the rail.

6. The keyboard testing apparatus as claimed in claim 2, wherein an L-shaped guide rail is fixed in the housing.

7. The keyboard testing apparatus as claimed in claim 6, wherein the retaining device is movably mounted on the guide rail.

8. The keyboard testing apparatus as claimed in claim 1, wherein the retaining device comprises a movable shaft having an end to which a retaining member is attached for being moved by the movable shaft relative to the keyboard in order to releasably retain the keyboard.

9. The keyboard testing apparatus as claimed in claim 8, wherein the retaining device comprises a pneumatic cylinder for driving the movable shaft relative to the keyboard.

10. The keyboard testing apparatus as claimed in claim 1 further comprising a detecting element to detect the presence of the keyboard between the clamping members.

11. The keyboard testing apparatus as claimed in claim 10, wherein the retaining device is actuated by the detecting element to retain the keyboard in position.

12. The keyboard testing apparatus as claimed in claim 1, wherein the movable shaft of each key actuator is pre-loaded by a spring.

13. The keyboard testing apparatus as claimed in claim 1, wherein each key actuator is fixed to a block which is releasably supported on a support member for adjusting relative position of the key actuator with respect to the support member.

14. The keyboard testing apparatus as claimed in claim 13, wherein the movable shaft of each key actuator is pre-loaded by a spring located between the block and the end of the shaft.

15. The keyboard testing apparatus as claimed in claim 13, wherein the support member is L-shaped having a vertical section and a horizontal section, the vertical section defining an elongate slot along which the block is guided to move.

16. The keyboard testing apparatus as claimed in claim 15, wherein the block defines an inner-threaded hole which is engaged with a bolt extending through the elongate slot of the support member.

17. The keyboard testing apparatus as claimed in claim 15, wherein the horizontal section of the L-shaped support member is mounted to a slide plate to be movable therewith.

18. The keyboard testing apparatus as claimed in claim 17, wherein the slide plate is coupled to the rail of the conveying device to be driven thereby.

19. The keyboard testing apparatus as claimed in claim 1, wherein the conveying device comprises a motor driving the rail thereof.

20. The keyboard testing apparatus as claimed in claim 1, wherein the signal adapter defines different sockets therein adapted to mate with different type output connectors of the keyboard.

21. The keyboard testing apparatus as claimed in claim 1, wherein the control unit comprises a processor-based device.

22. The keyboard testing apparatus as claimed in claim 21, wherein the processor-based device comprises a programmable logic control.

23. The keyboard testing apparatus as claimed in claim 21, wherein the processor-based device comprises a personal computer.

24. The keyboard testing apparatus as claimed in claim 1, wherein the warning device comprises a buzzer.

* * * * *